United States Patent
Fernandez et al.

(10) Patent No.: US 10,884,723 B2
(45) Date of Patent: Jan. 5, 2021

(54) MODIFICATION OF SOFTWARE BEHAVIOR IN RUN TIME

(71) Applicant: Facebook, Inc., Menlo Park, CA (US)

(72) Inventors: Luis Fernando Fernandez, Madrid (ES); Ivan Mayo, Madrid (ES); Carlos Lopez Menendez, Madrid (ES); Jose Manuel Bento Chaves, Madrid (ES)

(73) Assignee: Facebook, Inc., Menlo Park, CA (US)

( * ) Notice: Subject to any disclaimer, the term of this patent is extended or adjusted under 35 U.S.C. 154(b) by 38 days.

(21) Appl. No.: 16/064,919

(22) PCT Filed: Jan. 20, 2017

(86) PCT No.: PCT/EP2017/051211
§ 371 (c)(1),
(2) Date: Jun. 21, 2018

(87) PCT Pub. No.: WO2017/125561
PCT Pub. Date: Jul. 27, 2017

(65) Prior Publication Data
US 2019/0004783 A1    Jan. 3, 2019

Related U.S. Application Data

(60) Provisional application No. 62/281,323, filed on Jan. 21, 2016.

(51) Int. Cl.
*G06F 8/61* (2018.01)
*G06F 9/451* (2018.01)
(Continued)

(52) U.S. Cl.
CPC ............... *G06F 8/61* (2013.01); *G06F 9/451* (2018.02); *G06F 9/452* (2018.02); *G06F 8/62* (2013.01);
(Continued)

(58) Field of Classification Search
CPC ... G06F 8/61; G06F 8/62; G06F 9/451; G06F 9/452; G06F 9/4451; G06F 9/44505; G06F 2009/45562
See application file for complete search history.

(56) References Cited

U.S. PATENT DOCUMENTS 8,448,067 B2 *  5/2013  Cerny ...................... G06T 1/20
                                                         715/719
9,035,947 B2 *  5/2015  Jensen .................... G06T 15/00
                                                         345/418
(Continued)

FOREIGN PATENT DOCUMENTS

CN    102197374 B  *  4/2014  ........... G06F 9/4406

OTHER PUBLICATIONS

Czy!ewski et al., "Multimodal human-computer interfaces based on advanced video and audio analysis", 2013, IEEE (Year: 2013).*
(Continued)

*Primary Examiner* — Wei Y Zhen
*Assistant Examiner* — Junchun Wu
(74) *Attorney, Agent, or Firm* — Perkins Coie LLP

(57) ABSTRACT

When executed by one or more processors in a computer system, an application program may provide, to an electronic device, image information that specifies a user interface for display on the electronic device, and may receive, from the electronic device, information that specifies user-interface activity of the user. Furthermore, when executed by the one or more processors, the modification program may identify a state of the application program. Then, the modification program may selectively modify the image information based on the identified state to change the user interface without changing source code for the application program or a compiled executable of the application program, and may provide the modified image information to the electronic device for display. Subsequently, based on
(Continued)

information that specifies a user-interface activity of the user that is associated with the modified user interface, the modification program may selectively perform an operation.

20 Claims, 13 Drawing Sheets

(51) Int. Cl.
  *G06F 9/445* (2018.01)
  *G06F 9/455* (2018.01)
(52) U.S. Cl.
  CPC ........ *G06F 9/4451* (2013.01); *G06F 9/44505* (2013.01); *G06F 2009/45562* (2013.01)

(56) References Cited

U.S. PATENT DOCUMENTS

| | | | | |
|---|---|---|---|---|
| 9,514,242 | B2* | 12/2016 | Jooste | G06F 16/9574 |
| 9,600,595 | B2* | 3/2017 | DeLuca | G06F 9/451 |
| 9,678,616 | B2* | 6/2017 | Cerny | G06F 3/048 |
| 10,447,744 | B2* | 10/2019 | Feldman | G06F 3/0481 |
| 10,452,359 | B2* | 10/2019 | Valtchev | G06F 8/38 |
| 2008/0222618 | A1* | 9/2008 | Valtchev | G06F 9/542 |
| | | | | 717/139 |
| 2009/0158315 | A1* | 6/2009 | Bendall | H04N 7/185 |
| | | | | 725/32 |
| 2010/0077058 | A1* | 3/2010 | Messer | G06F 9/452 |
| | | | | 709/219 |
| 2013/0207981 | A1* | 8/2013 | Quirk | G09G 5/08 |
| | | | | 345/473 |
| 2013/0222397 | A1* | 8/2013 | Master | G06F 9/45512 |
| | | | | 345/502 |
| 2014/0033091 | A1* | 1/2014 | Schein | G06F 9/451 |
| | | | | 715/764 |
| 2014/0344806 | A1* | 11/2014 | Suresh | G06F 9/45533 |
| | | | | 718/1 |
| 2016/0048398 | A1* | 2/2016 | Taylor | G06F 9/4843 |
| | | | | 717/168 |
| 2016/0092083 | A1* | 3/2016 | Korkus | G06F 9/451 |
| | | | | 715/765 |
| 2016/0156943 | A1* | 6/2016 | Hattori | H04N 21/8455 |
| | | | | 725/116 |
| 2016/0189685 | A1* | 6/2016 | Ryan | G09G 5/12 |
| | | | | 345/547 |

OTHER PUBLICATIONS

Schroeter et al., "SUPRIM: Easily Modified Image Processing Software", 1996, Journal of Structural Biology (Year: 1996).*
Stone et al., "The Movable Filter as a User Interface Tool", 1994, ACM (Year: 1994).*
Lindbald et al., "The VuSystem: A Programming System for Visual Processing of Digital Video", 1994, ACM (Year: 1994).*
PCTEP2017051211 International Search Report and Written Opinion, European Patent Office, dated Jun. 2, 2017, Authorized Officer Vivian Angelique.
Scheifler et al.; "The X Window System", ACM Transactions on Graphics, vol. 5, No. 2, Apr. 1986, pp. 79-109.

* cited by examiner

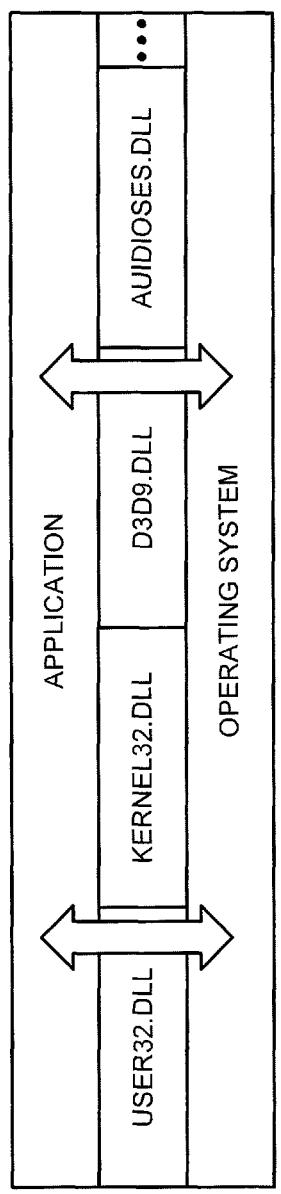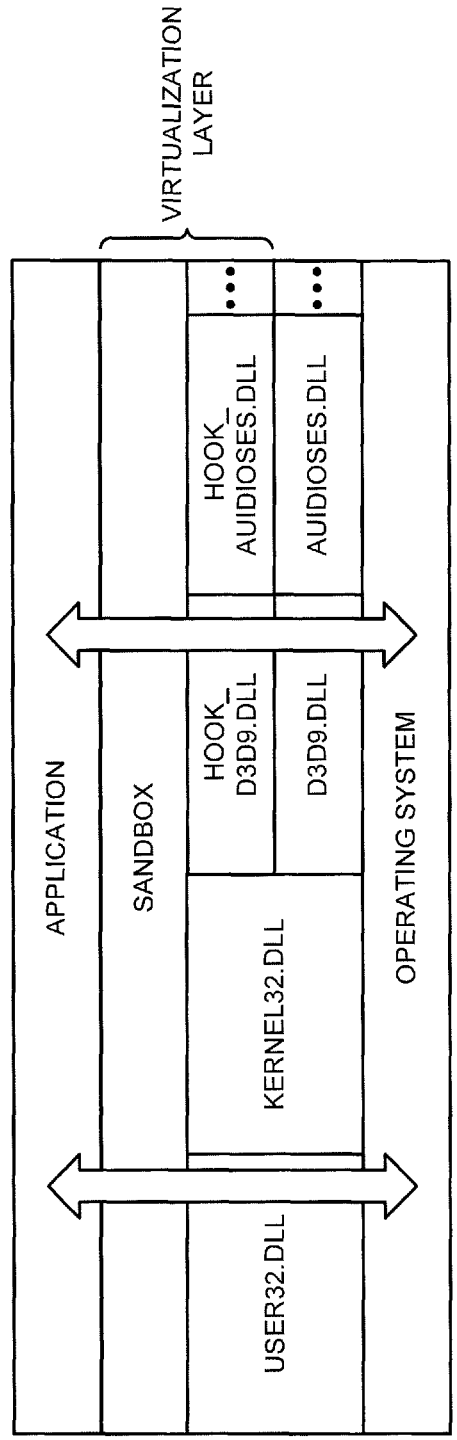
FIG. 7
FIG. 8

MODIFICATION OF SOFTWARE BEHAVIOR IN RUN TIME

BACKGROUND

Field

The described embodiments relate to techniques for modifying software behavior. In particular, the described embodiments relate to techniques for modifying software behavior in run time without modifying the original source code or the compiled executable.

Related Art

Video games are a popular form of entertainment. During a video game, a user or player interacts, via a user interface, with an environment represented by displayed two or three-dimensional images. The player interactions generate sensory feedback, such as changes in the displayed images.

Historically, a user played a video-game application or program that was executed on a local platform electronic device, such as a game console or a personal computer. Recently, users play video games online. For example, a user may play a video game that is executed on a remotely located cloud-based servers or computer systems via a network, such as the Internet.

In principle, executing a video game (and, more generally, an arbitrary program or application) in a cloud-based computer system offers many advantages. In particular, a remotely located cloud-based computer system may be more efficient and can reduce costs. For example, a cloud-based computer system may be easier to maintain and can be used to service multiple concurrent users. In addition, the cloud-based computer system can reduce or eliminate theft or unauthorized use of the video game.

However, in practice the use of a cloud-based computer system can pose challenges. For example, video games are often developed for use in a particular environment, such as a manufacturer's game counsel. It can be difficult to port these video games into a different environment, such as that of the cloud-based computer system. In particular, there may be additional desired features or existing features that are not supported in the original video game or in the cloud-based computing environment. This can be particularly difficult with legacy video games, such as older, but popular video games.

Furthermore, network limitations can make it difficult to provide dynamic real-time interaction with users at remote locations. This may be especially challenging for popular video games that are being concurrently used by a large number of users.

These difficulties may degrade the user experience when playing video games on a cloud-based computer system.

SUMMARY

A first group of described embodiments relate to a computer system that modifies a user interface associated with an application program without changing source code for the application program or a compiled executable of the application program. This computer system may include an interface circuit that communicates with at least an electronic device, which may be associated with a user of the application program. Moreover, the computer system may include: one or more processors that execute the application program and a modification program; and memory that stores the application program and the modification program. When executed by the one or more processors, the application program provides, to the electronic device, image information that specifies the user interface for display on the electronic device, and receives, from the electronic device, information that specifies user-interface activities of the user. Furthermore, when executed by the one or more processors, the modification program identifies a state of the application program. Then, the modification program selectively modifies the image information based on the identified state to change or modify the user interface (and, more generally, a behavior of the application program), and provides the modified image information to the electronic device for display. Subsequently, when the modification program receives, from the electronic device, information that specifies a user-interface activity of the user that is associated with the modified user interface, the modification program selectively performs an operation based on the user-interface activity.

Note that the state of the application program may be identified by analyzing the image information in a video frame buffer (thus, the image information may include a video frame). For example, the modification program may only analyze a subset of pixels in the user interface that are associated with user-interface icons. Alternatively or additionally, the modification program may analyze the image information using an image-pattern recognition technique.

Moreover, the modification program may modify the image information by combining the image information with predetermined additional image information that specifies the change in the user interface. The change may include adding or removing content or user-interface functions in the user interface.

Furthermore, the modification program may perform the aforementioned operations while the application program is executed by the one or more processors in run time.

Additionally, the computer system may be located proximate to or remotely from the electronic device. For example, the computer system may be implemented or included in the electronic device, may be included in a same physical environment as the electronic device or the computer system may be cloud-based computer system.

Note that the operation may include: changing a state of the application program, providing additional information to the electronic device, or modifying the user-interface activity before providing the modified user-interface activity to the application program.

In some embodiments, the application program includes a video game.

A second group of embodiments provides a computer system that avoids corruption of an operating-system registry by installing and uninstalling an application program in a virtual disk partition each time the application program is used.

A third group of embodiments provides a computer system that allows multiple users to independently (i.e., without interactions between the users) access a session having a common user profile in an operating system in the computer system via a virtual machine that is running one or more application programs.

A fourth group of embodiments provides a computer system that provides unified capture of content in an arbitrary window on a virtual machine that is running an application program independent of a rendering path or a rendering technique used by the application program.

A fifth group of embodiments provides a computer system that allows multiple users at different locations to access an application program that is running in a virtual machine as if the users are collocated. For example, the computer system may modify behavior of the application program so that the application program can be used in a cloud-based or online computing environment. Note that the modification to the behavior of the application may not involve changing source code for the application program or a compiled executable of the application program.

A sixth group of embodiments provides a computer system that decomposes an application program into two virtual disks or partitions to separate application data from user data, while allowing the two virtual disks to be mounted by a virtual machine running the application program as if the application program was installed on a single virtual disk.

Another embodiment provides a computer-readable storage medium with the modification program for use with the computer system. When executed by the computer system, the modification program causes the computer system to perform at least some of the aforementioned operations in at least one of the groups of embodiments.

Another embodiment provides a method, which may be performed by the computer system. This method includes at least some of the aforementioned operations in at least one of the groups of embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 7 is a drawing illustrating execution of an application program in an operating system of the computer system in FIG. 1 in accordance with an embodiment of the present disclosure.

FIG. 8 is a drawing illustrating sandboxed execution of an application program in an operating system of the computer system in FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
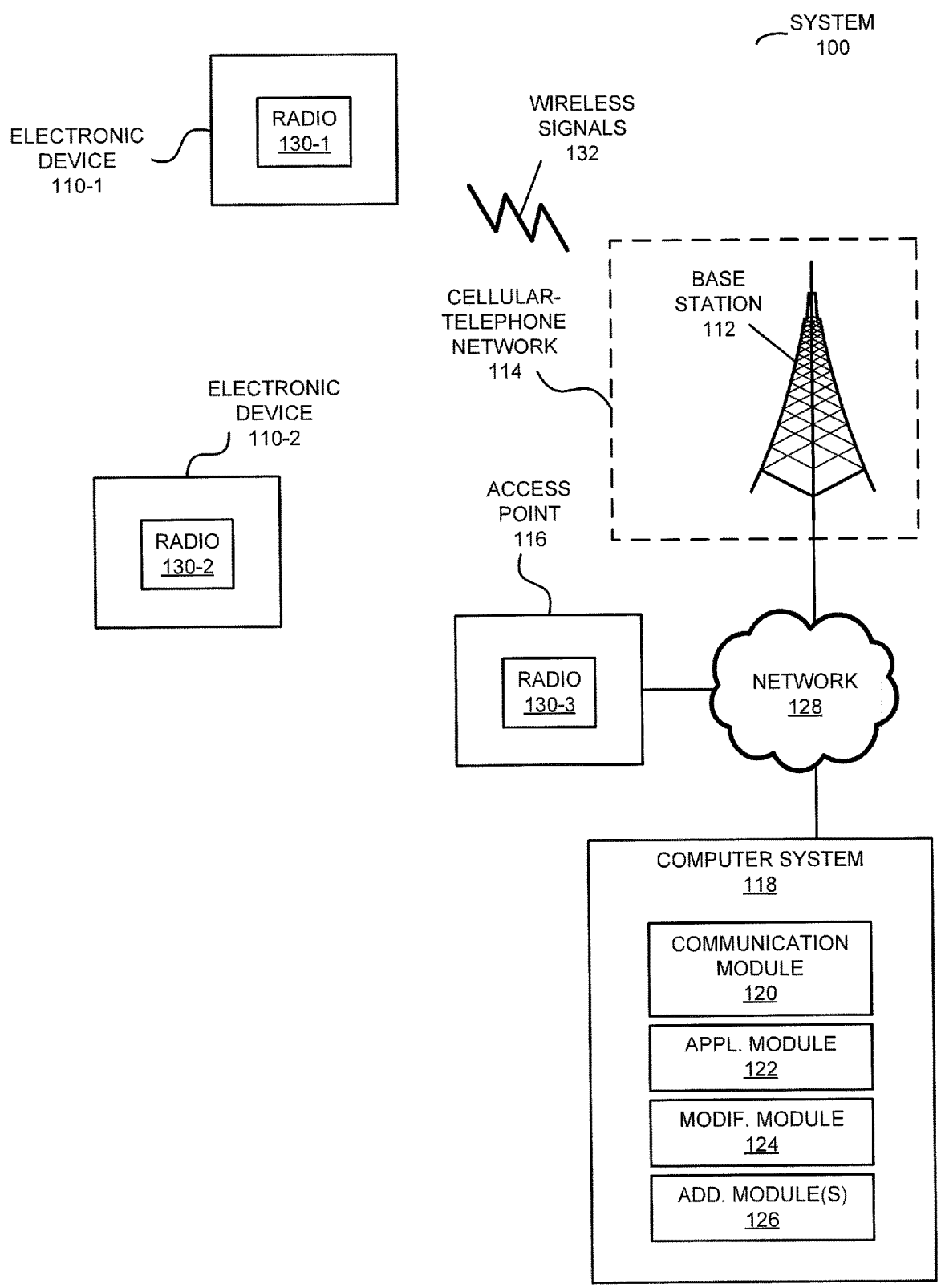
FIG. 1 is a block diagram illustrating communication among electronic devices in a system in accordance with an embodiment of the present disclosure.

A computer system that modifies a user interface associated with an application program without changing source code for the application program or a compiled executable of the application program is described. When executed by one or more processors in the computer system, the application program may provide, to an electronic device, image information (such as a video frame) that specifies the user interface for display on the electronic device, and may receive, from the electronic device, information that specifies user-interface activities of the user. Furthermore, when executed by the one or more processors, the modification program may identify a state of the application program. Then, the modification program may selectively modify the image information based on the identified state to change the user interface (and, more generally, a behavior of the application program), and may provide the modified image information to the electronic device for display. Subsequently, when the modification program receives, from the electronic device, information that specifies a user-interface activity of the user that is associated with the modified user interface, the modification program may selectively perform an operation based on the user-interface activity.

By selectively modifying the behavior of the application program in run time, this computing technique may allow the computer system to dynamically modify the application program (such as based on the state of the application program), even in instances where the source code is unavailable or the compiled executable cannot be changed. In particular, the computing technique may allow the application program to be used in different environments (such as on a game pad instead of a personal computer, or in the environment of the computer system). Moreover, the computing technique may allow the computer system to remove content or functionality (such as a user-interface icon) and/or to add content or functionality to the user interface. Consequently, the computing technique may improve the user experience when using the application program.

In the discussion that follows, an individual or a user may be a person. Also, or instead, the computing technique may be used by any type of organization, such as a business, which should be understood to include for-profit corporations, non-profit corporations, groups (or cohorts) of individuals, sole proprietorships, government agencies, partnerships, etc.

Moreover, while a video game is used as an illustrative example in the discussion that follows, in other embodiments the application program is an arbitrary type of program or software, such as: a word-processing application, a spreadsheet application, accounting software, income-tax preparation software, social-networking software, scientific software, high-performance computing software, etc.

Furthermore, in the discussion that follows, electronic devices and/or components in the system may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'WiFi®', from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G communication protocol, such as UMTS, LTE), an IEEE 802.3 standard (which is sometimes referred to as 'Ethernet'), etc. In the discussion that follows, Ethernet and Wi-Fi are used as illustrative examples.

Additionally, in the discussion that follows Windows (from Microsoft Corp. of Redmond, Wash.) is used as an illustrative example. However, the computing technique may be used with a variety of operating systems, including embedded operating systems. For example, the computing technique may be used with: Linux, Android (from Google, Inc. of Mountain View, Calif.), iOS (from Apple, Inc. of Cupertino, Calif.), a Macintosh operating system (from Apple, Inc. of Cupertino, Calif.), etc.

Communication among electronic devices is shown in FIG. 1, which presents a block diagram illustrating a system 100 that dynamically modifies a behavior of an application program. In particular, system 100 includes one or more electronic devices 110, an optional base station 112 in a cellular-telephone network 114, an optional access point 116, and/or a computer system 118 (which are sometimes collectively referred to as 'components' in system 100). For example, the one or electronic devices 110 may include one or more instances of electronic devices, such as portable electronic devices, e.g., cellular telephones. Moreover, computer system 118 may include: a communication module (or engine) 120, an application module (or engine) 122, a modification module (or engine) 124 and/or one or more additional module(s) (or engine(s)) 126.

Note that components in system 100 may communicate with each other via a network 128, such as the Internet, a cellular-telephone network and/or a wireless local area network (WLAN). In particular, application module 122 may execute an application program (which is sometimes referred to as an 'application,' an 'application program module,' or 'application software') that performs a group of coordinated functions, tasks, or activities for the benefit of at least a user. For example, the application module may include a video game (more generally, the application module may perform an arbitrary group of functions). Then, communication module 120 may provide, via network 128, image information (such as video frames) to one or more of electronic devices 110 (such as electronic device 110-1) for display to a user. The image information may include a user interface associated with the application module, which may include one or more user-interface icons and/or content. Moreover, the user may interact with the user interface using one or more user-interface control devices (such as a keyboard, a touchpad, a mouse, a non-contact user-interface control device or input device, e.g., based on wireless ranging, etc.) to activate one of the user-interface icons or to position a cursor at a location in the user interface. These user-interface activities may be captured by electronic device 110-1, and information specifying the user-interface activities may be provided, via network 128, to computer system 118. Thus, the communication in FIG. 1 may be bidirectional and may include image information, information that specifies user-interface activities, user data, application data, etc.

In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets (which may include the user-defined items of interest, the input data, the one or more requests, the feedback, and/or the result).

Figure 15:
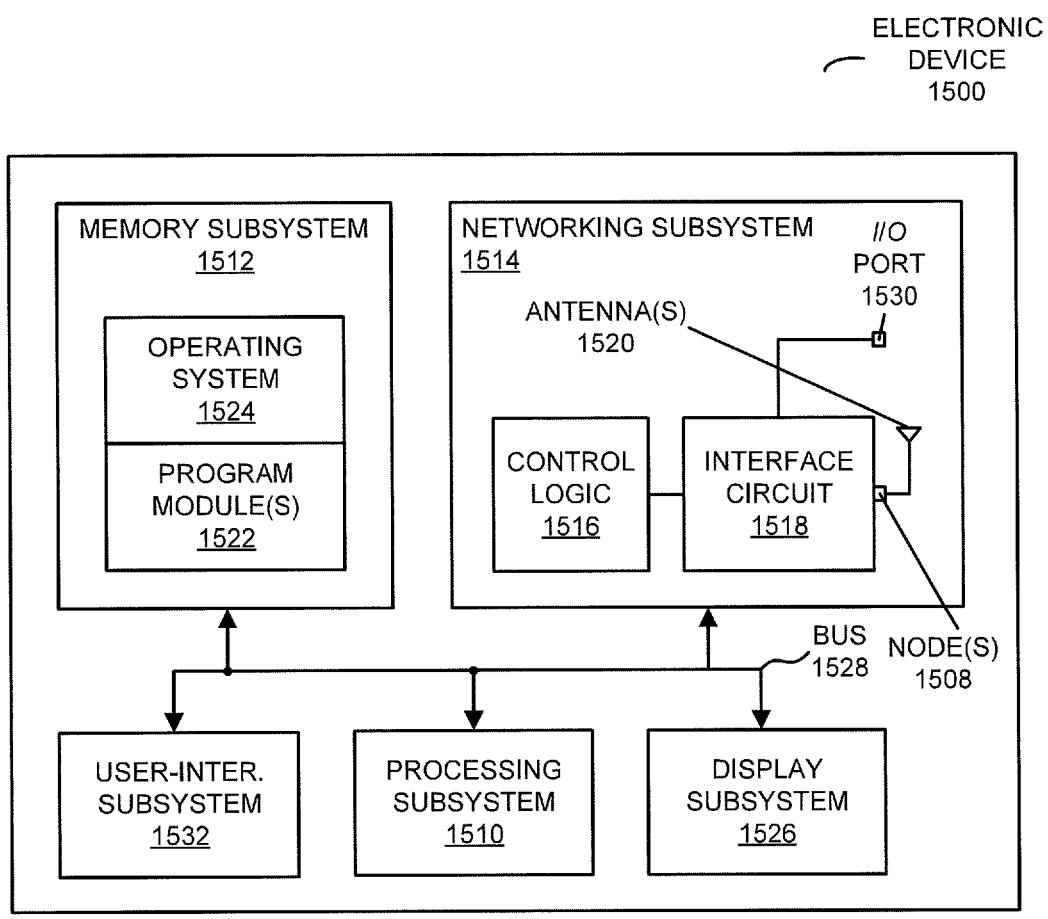
FIG. 15 is a block diagram illustrating an electronic device in accordance with an embodiment of the present disclosure.

As described further below with reference to FIG. 15, the one or more electronic devices 110, optional base station 112 in cellular-telephone network 114, optional access point 116, and computer system 118 may include subsystems, such as a networking subsystem, a memory subsystem and a processor subsystem. In addition, the one or more electronic devices 110, optional base station 112, optional access point 116, and/or computer system 118 may include radios 130 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 132 (represented by jagged lines) are transmitted by radios 130 in the components. For example, radio 130-1 in electronic device 110-1 may transmit information (such as packets) using wireless signals. These wireless signals may be received by radios 130 in one or more of the other components, such as by optional base station 112 or optional access point 116. This may allow electronic device 110-1 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the user-defined items of interest, the input data, the one or more requests, the feedback, the result, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, it sometimes difficult to run application programs in different environments. For example, functionality that is available or supported in one environment may not be available or supported in another. In addition, it is sometimes difficult to change the behavior or functionality of an application program, especially when the source code is unavailable, the compiled executable cannot be changed or when the desired change is needed in real time (such as in run time while an application program is being executed).

In order to address these challenges, computer system 118 may implement the computing technique. In particular, computer system 118 may perform the computing technique to modify behavior of an application program (such as changing a user interface associated with the application program) without changing source code for the application program or a compiled executable of the application program. During operation, modification module 124 may execute a modification program (which is sometimes referred to as a 'modification program module,' or 'modification software'). This modification program may identify a state of the application program. For example, the state of the application program may be identified by analyzing image information in a video frame buffer that includes or specifies a user interface. Because of limitations on the bandwidth of network 128 and the desire to perform the modification in run time, the modification program may only analyze a subset of pixels in the user interface that are associated with user-interface icons. In some embodiments, the modification program analyzes one or more pixels at specific locations in the user interface that include or that are associated with user-interface icons. Alternatively or additionally, in embodiments with sufficient network bandwidth and processing capability, the modification program may analyze the image information using an image-pattern recognition technique, such as: a feature extraction technique or a description technique, such as: scale invariant feature transform (SIFT), speed-up robust features (SURF), a binary descriptor (such as ORB), binary robust invariant scalable keypoints (BRISK), fast retinal keypoint (FREAK), etc. Note that the features may include: edges associated with objects in the image information, corners associated with the objects, lines associated with objects, conic shapes associated with objects, color regions within the image information, and/or texture associated with objects.

Then, the modification program may selectively modify, in run time, the image information (such as a video frame) provided by the application program to electronic device 110-1 via network 128. The modified image information may change the user interface associated with the application program (and, more generally, a behavior of the application program). Thus, the modified image information may include additional or fewer user-interface icons, more or less content, etc. For example, the modified image information may include a help user-interface icon that the user can activate to receive additional help content or instructions, such as help content that is relevant when the application program is executing or running in an environment of computer system 118.

Moreover, the modification program may modify the image information by combining the image information with predetermined additional image information that specifies the change in the user interface. The change may include adding or removing content and/or user-interface functions in the user interface (such as a user-interface icon).

Next, via communication module 120 and network 128, the modification program may provide the modified image information to electronic device 110-1 on a display in or associated with electronic device 110-1.

Subsequently, when the modification program receives, from electronic device 110-1 via network 128, information that specifies a user-interface activity of the user that is associated with the modified user interface, the modification program may selectively perform an operation based on the user-interface activity. For example, the information may indicate that: a cursor in the user interface is proximate to a user-interface icon or that the user is viewing or gazing at the user-interface icon, the user has activated the user-interface icon (such as by clicking on the user-interface icon, contacting a surface of a touch-sensitive display with a virtual strike area of the user-interface icon, etc.), etc. In response, the modification program may: change a state of the application program (such as switching to another user interface), provide additional information to electronic device 110-1 (such as help content), or modify the user-interface activity before providing the modified user-interface activity to the application program. In particular, the modification program may detect activation of the added help user-interface icon, and in response may provide help content to electronic device 110-1 for display. Alternatively or additionally, when the modification deactivates functionality in the user interface (such as a particular user-interface icon), the modification program may determine that the user-interface activity indicates the 'deactivated' user-interface icon was activated. In response, the modification program may modify the information that specifies the user-interface activity so that the user-interface activity no longer indicates that the user-interface icon was activated. In addition, the modification program may provide a notification for display in the user interface that indicates that the user-interface icon is not active or is not supported.

Note that computer system 118 may be located proximate to or remotely from electronic device 110-1. For example, computer system 118 may be implemented or included in electronic device 110-1, may be included in a same physical environment as electronic device 110-1 or computer system 118 may be cloud-based computer system.

In this way, the computing technique may allow computer system 118 to customize or tailor the behavior of the application program in run time while the application program is executing or running on computer system 118.

Figure 2:
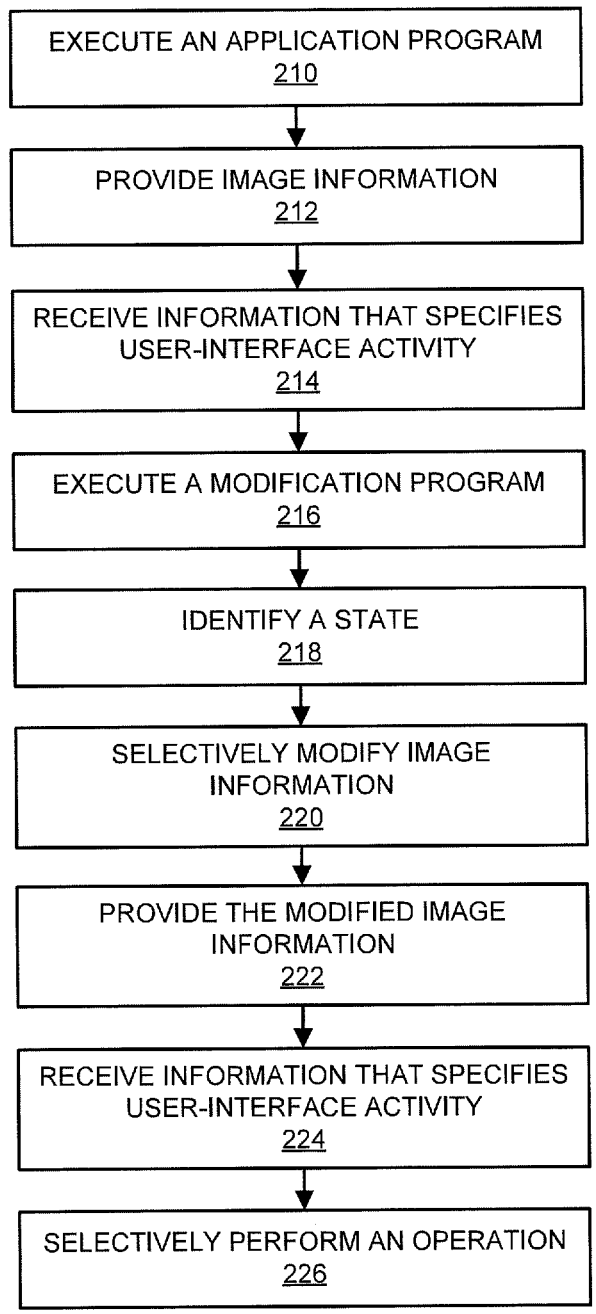
FIG. 2 is a flow diagram illustrating a method for modifying behavior of an application program in accordance with an embodiment of the present disclosure.

We now describe embodiments of a method. FIG. 2 presents a flow diagram illustrating an example of a method 200 for modifying behavior of an application program, which may be performed by a computer system (such as computer system 118 in FIG. 1). During operation, the computer system may execute an application program (operation 210), such as a video game. When executed by the computer system, the application program may provide, to an electronic device, image information (operation 212) that specifies a user interface for display on the electronic device. In response, the application program may receive, from the electronic device, information that specifies user-interface activities (operation 214) of the user.

Furthermore, the computer system may execute a modification program (operation 216). When executed by the computer system, the modification program may identify a state (operation 218) of the application program. For example, the state of the application program may be identified by analyzing the image information in a video frame buffer (thus, the image information may include a video frame). In some embodiments, the modification program only analyzes a subset of pixels in the user interface that are associated with user-interface icons. Alternatively or additionally, the modification program may analyze the image information using an image-pattern recognition technique.

Then, the modification program may selectively modify the image information (operation 220) based on the identified state to change the user interface (and, more generally, a behavior of the application program), and may provide the modified image information (operation 222) to the electronic device for display. For example, the modification program may modify the image information by combining the original image information with predetermined additional image information that specifies the change in the user interface. The change may include adding or removing content or user-interface functions in the user interface (such as a user-interface icon). Moreover, note that the modification program may provide the modified image information to the electronic device directly or indirectly, such as using the application program.

Subsequently, when the modification program receives, from the electronic device, information that specifies a user-interface activity (operation 224) of the user that is associated with the modified user interface, the modification program may selectively perform an operation (operation 226) or a remedial action based on the user-interface activity. For example, the operation may include: changing a state of the application program, providing additional information to the electronic device (such as additional content that is displayed in the user interface), or modifying the user-interface activity before providing the modified user-interface activity to the application program (which may provide additional functionality to or may remove functionality from the original user interface).

In this way, method 200 may facilitate modification of the behavior in run time without changing the source code or the compiled executable for the application program.

Figure 3:
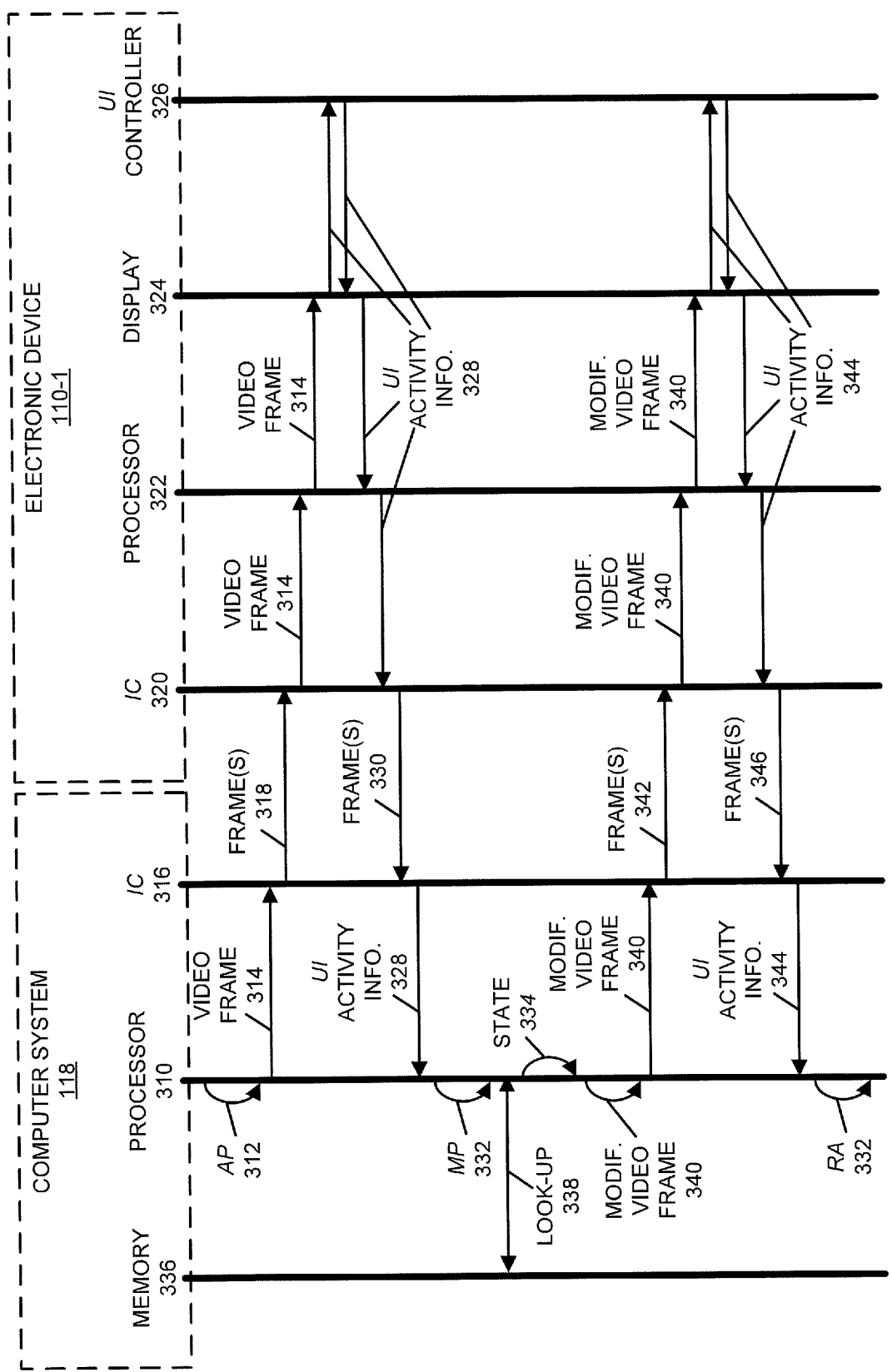
FIG. 3 is a drawing illustrating communication among the electronic devices in FIG. 1 in accordance with an embodiment of the present disclosure.

FIG. 3 presents a drawing illustrating an example of communication among computer system 118 and electronic device 110-1. In FIG. 3, processor 310 in computer system 118 may execute application program (AP) 312. During execution, this application program may generate a video frame 314 that includes a user interface and that is associated with a current state of application program 312. Interface circuit (IC) 316 in computer system 118 may transmit one or more frames 318 that include video frame 314 to electronic device 110-1.

After receiving frames 318, interface circuit 320 in electronic device 110-1 may provide video frame 314 to processor 322 in electronic device 110-1, which may provide video frame 314 to display 324.

Subsequently, user-interface (UI) controller 326 in electronic device 112-1 may receive user-interface activity information 328, such as a cursor location in the user interface, activation of a user-interface icon, etc. User-interface controller 326 may provide user-interface activity information 328 to processor 322, which instructs interface circuit 320 to provide this information to computer system in one or more frames 330. After receiving frames 330, interface circuit 316 may provide user-interface activity information 328 to processor 310.

Furthermore, processor 310 may execute modification program (MP) 332. During execution, this modification program may identify state 334 of application program 312. For example, the state of the application program may be identified by analyzing video frame 314 in a video frame buffer that is associated with application program 312. Note that the identification may use predetermined information about the user interface that is stored in memory 336, which may be accessed or looked-up 338 by processor 310.

Then, modification program 332 may selectively modify video frame 314 to generate modified video frame 340 based on the identified state 334 to change the user interface (and, more generally, a behavior of application program 312). Next, processor 310 may provide the modified video frame 340 to interface circuit 316, which may transmit one or more frames 342 that include the modified video frame 340 to electronic device 110-1.

After receiving frames 342, interface circuit 320 may provide the modified video frame 340 to processor 322, which may provide the modified video frame 340 to display 324.

Subsequently, user-interface controller 326 may receive user-interface activity information 344. User-interface controller 326 may provide user-interface activity information 344 to processor 322, which instructs interface circuit 320 to provide this information to computer system in one or more frames 346. After receiving frames 346, interface circuit 316 may provide user-interface activity information 344 to processor 310. In response, modification program 332 may perform a remedial action (RA) 348, such as: changing a state of application program 312, providing additional information to electronic device 112-1 (such as additional content that is displayed on display 324), or modifying user-interface activity information 344 before providing the modified user-interface activity to application program 312 (which may provide additional functionality to or may remove functionality from the original user interface in video frame 314).

Figure 4:
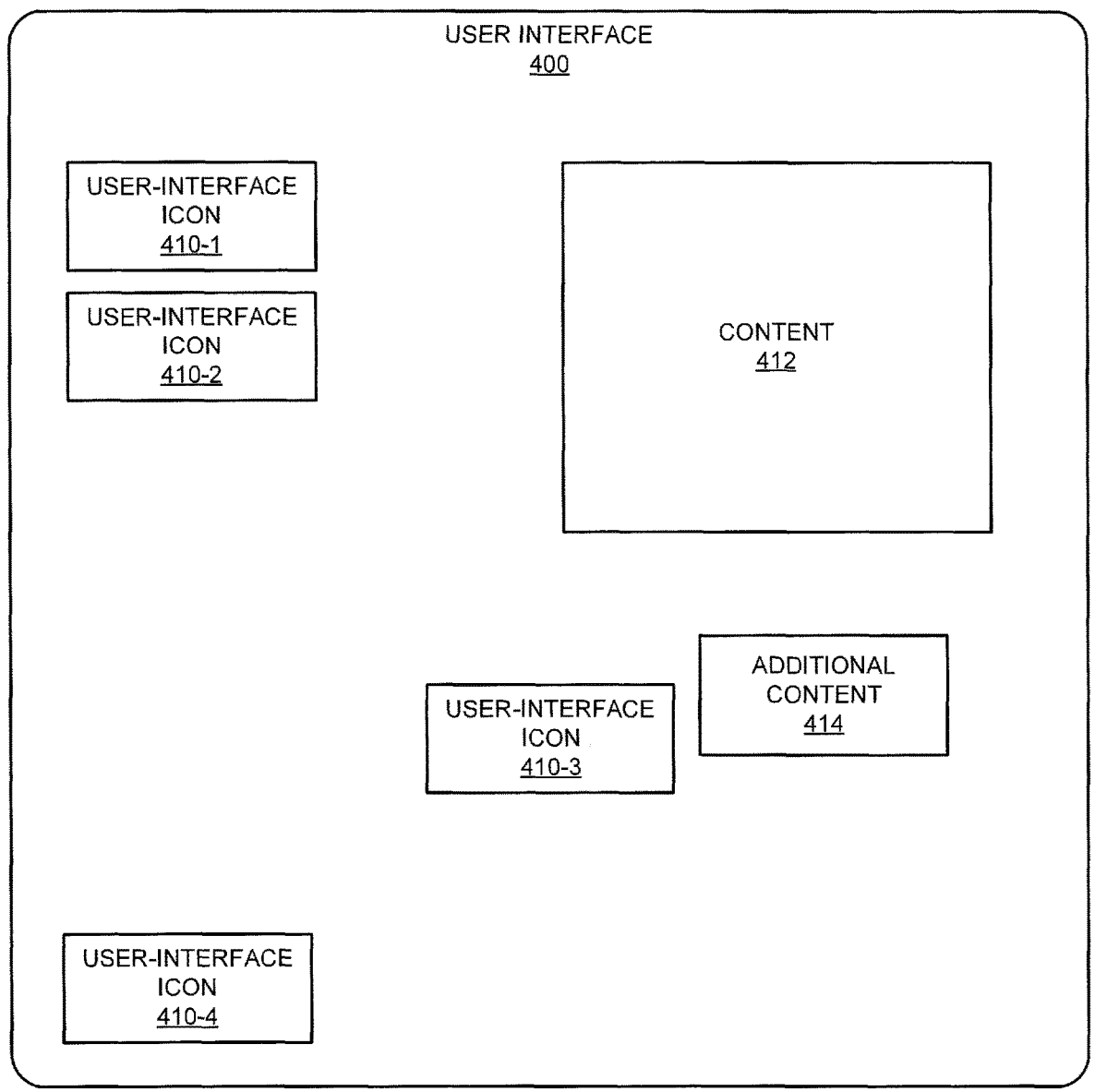
FIG. 4 is a drawing illustrating a user interface of an application program executed by the computer system in FIG. 1 in accordance with an embodiment of the present disclosure.

FIG. 4 presents a drawing illustrating an example of a user interface 400 of an application program executed by computer system 118 in FIG. 1. This user interface may include user-interface icons 410 (such as virtual user-interface icons or physical user-interface icons, e.g., radial buttons, pull-down menus, buttons, etc.) and content 412. During the computing technique, the computer system may modify user interface 400 by: adding user-interface icon 410-3, removing or deactivating user-interface icon 410-2, presenting additional content 414 (such as an explanation that user-interface icon 410-3 has been deactivated), etc.

In some embodiments, the computer system modifies the behavior of an application program in run time, without previous modification of the source code of the application program or the compiled executable of the application program. This modification capability may be facilitated using one or more pattern-recognition techniques over static and/or dynamic images taken from the application program, which are used to detect the execution flow of the application program (and, more generally, the state of the application program).

For example, the computer system may modify application program in order to make it behave in different ways than it was supposed to behave (i.e., the computing technique may change the original specification of the application program) without changing the application program prior to the execution (thus, the modifications may occur during run time). Note that the computing technique may be used with a cloud-based computer system to run application program(s) and to limit or enhance their behavior without previous adaptation of the application program(s) to this environment.

During the computing technique, the computer system may perform: evaluation, analysis and execution. In particular, the evaluation may involve identifying a state of a target application program. In order to perform the evaluation, the computer system may run the application program and may access the frame buffer of the application program during execution to in order to choose or select the patterns that can subsequently be used to identify the state of the application program.

Note that during this operation, the computer system may store, in memory, information about or associated with the application program for subsequent use during the real-time analysis to identify the application-program status or state. In some embodiments, the identification is based on the presence of certain features (positive identification) and/or the absence of certain features (negative identification). For example, in positive identification, the application program may be in a desired state. Thus, a user may be in a specific menu and may be about to press or activate a specific option. Alternatively, in negative identification, the application program may be in any other state than the desired one. Thus, the user of a video game may not be in the main menu, or the application program may not be in the loading state.

Then, during the analysis, the predetermined (stored) information may be sued to identify the current state of the application program. For example, the analysis may involve or may use an image-pattern-recognition technique.

Once the state has been identified (i.e., where the user is within the application program), the computer system may perform the execution operation. In particular, the computer system may modify the behavior of the application program.

Note that the computer system may even stop/modify the inputs that the application receives. For example, if the computer system determines that the user has the mouse on top of a specific option in the menu, the computer system can capture the mouse click and may not let the operating system send the click to the application program, so the user will never be able to use that option. In addition, the computer system may capture the frame buffer of the application program before it is sent to the monitor to add a message to it (such as 'option not available'). In this way, the user may receive a notification that the option is not available and the application program will not know that the computer system has altered its behavior.

Figure 5:
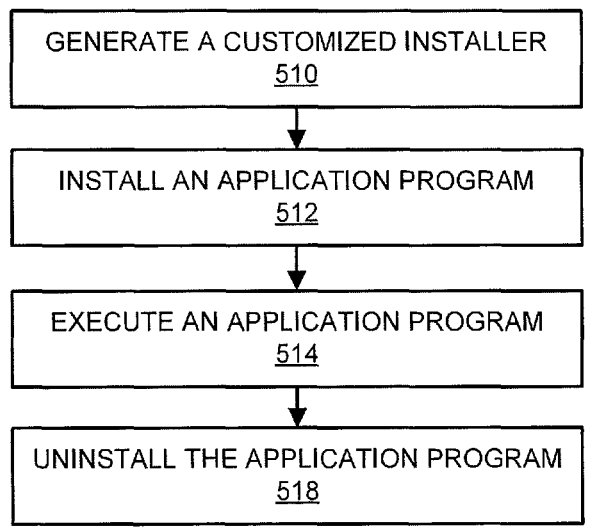
FIG. 5 is a flow diagram illustrating a method for installing and uninstalling an application program in a virtual disk partition in accordance with an embodiment of the present disclosure.

We now describe additional embodiments of the computing technique, which may be used separately from each other or which may be used in conjunction with one or more of the other embodiments. FIG. 5 presents a flow diagram illustrating an example of a method 500 for installing and uninstalling an application program in a virtual disk partition, which may be performed by a computer system (such as computer system 118 in FIG. 1). During operation, the computer system generates a customized installer (operation 510) for an application program. In particular, while an original installer for the application program executes, the computer system may monitor the original installer to extract registry and file modifications.

Then, each time the application program is launched or activated by a user, the computer system may use the customized installer to: install the application program (operation 512) in a virtual disk in a sandboxed environment using a virtualized registry and without copying the application-program complied executable; execute the application program (operation 514); and, when the application program finishes, uninstalls the application program (operation 516), restores the original registry and removes the virtual registry used by the application program.

In some embodiments, the computer system installs, runs and uninstalls an application program each time a user wants to use that application program in order to keep a target machine (such as the computer system) clean after the execution. In particular, the computer system may execute an install-uninstall program or tool to generate a customized or ad-hoc installer for the application program by monitoring an original installer of the application program. This customized installer may extract the relevant parts of the installation (such as registry and file modifications), and may skip or avoid time-consuming tasks related to application-program file copying and modification (e.g., a link may be used to point to where the application-program files are stored). Note that the customized installer may use a virtualized registry in order make any changes, and thus may keep the real registry without alteration.

Then, the computer system may run or execute the application program. When the user exits the application program, the computer system may restore the original registry and may remove the files used by the application program.

In order to implement this embodiment of the computing technique, the computer system may prepare the environment and collect the necessary data. In particular, in order generate the ad-hoc installer, the computer system may launch the original installer with an internal tool named InstallSniffer that takes over the role of monitoring the tasks performed by the installer in real time. In this phase of the computing technique, InstallSniffer may record changes in the registry keys and files, and it may then create an InnoSetup script. The computer system may then compile the resulting script to generate a reduced executable installer that may only contain the relevant changes in the machine (i.e., the computer system), but without other packaging or information related to the application program.

Once the application program is installed in the hard disk, the computer system may create a virtual disk (vDisk) and may copy the contents of the application program, file by file. This virtual disk may be identified with a unique number, in order for it to be accessible further, as needed, by the computer system.

Next, the computer system may configure the application program for the first time. In this phase of the computing technique, the computer system may monitor the changes made in the user's folders and registry keys while the application program is running. Note that the user of the install-uninstall tool can manually fine-tune the settings of the application program as needed. Moreover, the contents of the settings folder may, selectively, be used to overwrite temporal changes that the user may perform in the settings in subsequent sessions.

This customized installer may be used to launch the application program in a virtual machine in a sandboxed environment. Note that a 'sandbox' may be an environment inside of which another program may be run and that isolates this program from the rest of the computer system.

Moreover, the virtual disk created during the data-collection phase may be attached to the virtual machine, and may be mounted in a specified folder. This virtual disk may contain the files and folders that belong to the target application program.

Furthermore, a user-profile template may be stored in the computer system in a virtual disk that mimics the folders of a user (such as AppData, documents, ProgramData, etc.). This virtual-profile template may be attached to the computer system as a repository to redirect reads and writes of user-related information.

Additionally, the computer system may include a file named ntuser.dat that contains a hive of the registry keys (such as HKEY_LOCAL_MACHINE and HKEY_CURRENT_USER). This hive may be loaded (or attached) in the subkey HKEY_USERS to virtualize accesses to registry.

Note that settings of the application program may be copied to the virtual user's profile before performing another installation task.

The ad-hoc or customized installer may execute the pre-compiled InnoSetup script and may write, delete or modify registry keys in the virtualized registry hive. Then, the target application program may run in a sandboxed environment to virtualize the user's profile entries, as well as registry accesses.

After the application program has finished, it may be uninstalled. In particular, in order to revert the virtual machine to its initial state once the application program has finished, the following operations may be performed. The application-program virtual disk may detach, so that the virtual disk containing the application program is first unmounted, and then detached from the virtual machine. Then, the user's virtual profile may detach, so that the virtual profile of the user is unmounted and detached from the virtual machine. Next, the virtual registry may detach, so that the registry hive is unloaded from the main registry. Furthermore, during cleanup, the virtual machine may be left untouched to delete the customized installer and the virtual registry files (such as appinstaller.exe and ntuser.dat, respectively).

The install-uninstall tool that generates the ad-hoc or customized installer may monitor, in real time, the changes performed by the installer, such as: a Microsoft Installer, Nullsoft, InnoSetup or InstallShield. In order to achieve this, the install-uninstall tool may run with administrator privileges and may launch the application-program installer. It may then monitor and intercept calls to Windows application program interface (API) functions from several modules, such as: Kernel32, Shell32, Advapi32, Msi, Ole32, etc.

In some embodiments, the installer uses non-trivial procedures, such as calling component object module (COM) servers to delegate the installation of certain parts, so API interception is not feasible unless a kernel level approach is used. In order to overcome this challenge, the install-uninstall tool may leverage additional techniques, such as subscription to file changes in broadcast mode, as well as snapshots of some parts of the registry before and after the installation.

Additionally, whenever an installer tries to open a Microsoft installer (.msi), this action or operation may be monitored, and their contents may be analyzed when the installer finishes, in order to retrieve changes in registry keys and files.

Note that the gathered data (such as registry changes and file modifications) may be stored in several Extensible Markup Language (XML) files. Moreover, the install-uninstall tool may generate an InnoSetup script (.iss) from a template, which may combine the information dumped in the XML files. This script may then be compiled to generate the customized installer, which may take less than a second to install the application program.

In this way, the computing technique may avoid corruption of the registry and, more generally, the operating system in the computer system.

Figure 6:
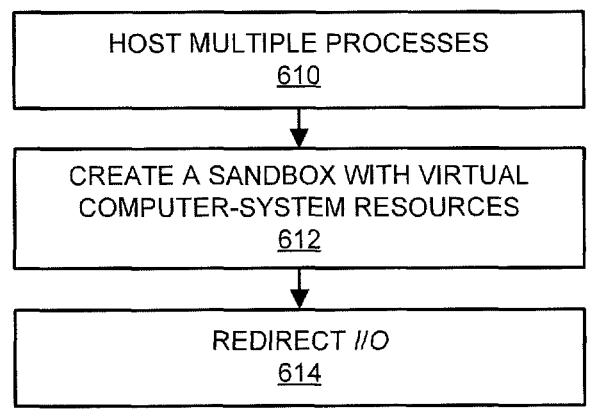
FIG. 6 is a flow diagram illustrating a method for allowing multiple users to access a session having a common user profile in accordance with an embodiment of the present disclosure.

FIG. 6 presents a flow diagram illustrating an example of a method 600 for allowing multiple users to access a session having a common user profile, which may be performed by a computer system (such as computer system 118 in FIG. 1). During operation, the computer system hosts multiple processes (operation 610) associated with different users concurrently in a common session having a single user profile on an operating system in a virtual machine running one or more application programs without interaction between the processes. Moreover, during the common session, the computer system may create a sandbox with virtual computer-system resources (operation 612) for each of the processes, and may redirect inputs and outputs (I/O) (operation 614) to real computer-system resources to the virtual computer-system resources, thereby isolating the processes from each other. More generally, communication between the processes and the operating system may be intercepted by the sandbox and may be modified by the sandbox in order to hide the users from each other in the common session.

In some embodiments, the computer system allows two or more users to access the same session with the same user profile on the operating system in a virtual machine running the same or different applications without interaction between them. In particular, maximizing user concurrency may be useful in a game-streaming platform. Consequently, each physical machine used by the platform or the computer system may host as many users as possible at the same time. Ideally, the computer system may get to 100% usage of the underlying hardware. In order to achieve this capability, each physical machine in existing computer systems is usually split into several virtual machines, and each user may be assigned to one of these virtual machines to run their application programs.

While this approach may improve concurrency, it may not achieve the theoretical concurrency limit, because the amount of resources needed by each application program varies a lot from one application program to the other. Moreover, the virtual machines may need to have enough or sufficient resources to host the most 'heavy' applications program in the platform. Consequently, when lighter applications programs are used, a lot of computer-system resources may be wasted.

In the computing technique, in order to improve concurrency, each virtual machine may serve several users instead of just one. However, most existing operating systems are not designed for being used by several different users at the same time on the same session. In particular, many system resources cannot be shared (such as the mouse or the keyboard). Furthermore, while other computer-system resources can be shared (such as the hard drive), they are typically accessible by other users, which may make the data from one user accessible to the other.

Note that users can be partially isolated from each other in a virtual machine by using a different session for each of them, but each session opened in the computer-system typically consumes a lot of computer-system resources (such as memory space or processor cycles) that could be used for hosting more users.

In the computing technique, an alternative approach is used for making the operating system capable of hosting several users concurrently within a single session without them interfering each other. In particular, this capability may be achieved by replacing each user by a single process in the active session. Moreover, each session can have several processes opened at the same time, although all of them may be sharing the computer-system resources. For example, only one process may have the input focus of the mouse and keyboard, and the other processes may not use them while they are being used by the first process. If these shared computer-system resources were virtualized, the computer system may force each process to 'see' every resource as exclusive and may not be aware that there are other processes in the computer system that are using the same computer-system resources.

Continuing with the previous example, the computer system can trick the application-program processes into believing that they each have the input focus, and when they read the input from the mouse or keyboard, these requests may be redirected to their own virtual mouse and keyboard. These virtual devices may be a bridge between the application-program process and the real devices that are in the remote machine used by the client (such as electronic device 110-1 in FIG. 1), thereby rendering the local electronic devices or the remote electronic devices from other users unreachable by the process. This approach may ensure that mouse clicks from one user cannot be received by other users that are sharing the same session.

Note that each user may be represented as a process in the active session on the virtual machine, and an intermediate software layer may be placed between the application-program process and the operating system for virtualizing the computer-system resources and isolating the users from each other. This intermediate layer is sometimes called or referred to as a sandbox.

During operation of the sandbox, when a user is connected to the computer system, the application program that they will be using runs as a normal application-program process on the active session, and the sandbox may be injected between the application-program process and the operation system. In this way, the communication between the application-program process and the computer system may be intercepted by the sandbox and can be modified without the application program noticing it. Note that injecting code may force an executing application-program process into loading code that was not in the original application program, usually without the injected application-program process noticing the change.

When the sandbox starts running, it may install hooks on each of the Windows API functions that are relevant for using computer-system resources. These hooks may modify the 'normal' behavior of these functions, effectively hiding the user from the rest of the users on the same session. For example, the API functions used for getting access to the document folder may be modified so that it returns a different folder for each user. By installing hooks in functions that access the computer-system resources to virtualize, the computer system can have several users in the same session without them 'seeing' each other. Note that installing a hook may involve dynamically modifying the code of a function by forcing a jump to a different code block, thereby modifying the behavior of the original function. The hook may or may not call the code of the original function.

In some embodiments, different users in the single session may use the same or different application programs. Moreover, the computer system may keep track of the states of the application programs for the different users.

FIG. 7 presents a drawing illustrating an example execution of an application program in an operating system of computer system 118 in FIG. 1. In particular, FIG. 7 illustrates the normal execution of an application program in an operating system, such as a version of Windows.

In contrast, FIG. 8 presents a drawing illustrating an example of sandboxed execution of an application program in an operating system (such as a version of Windows) of computer system 118 in FIG. 1.

Figure 9:
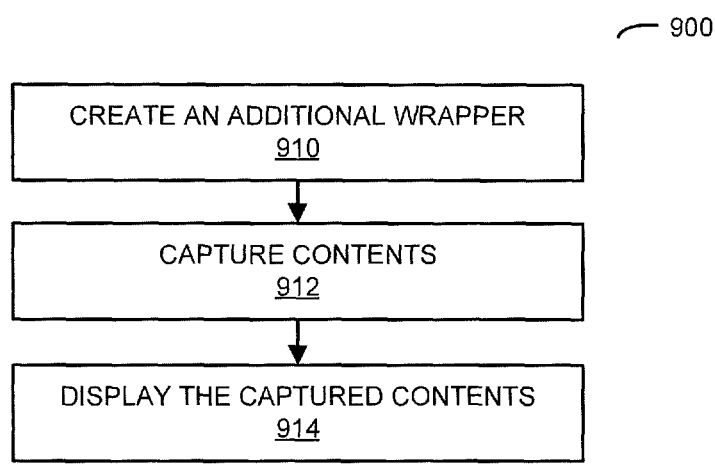
FIG. 9 is a flow diagram illustrating a method for providing unified capture of content in accordance with an embodiment of the present disclosure.

FIG. 9 presents a flow diagram illustrating an example of a method 900 for providing unified capture of content, which may be performed by a computer system (such as computer system 118 in FIG. 1). During operation, the computer system creates an additional wrapper (operation 910) to capture the contents of a window on a virtual machine independently of the rendering path or technique used by an application program. This additional wrapper may access surfaces using a single rendering technique (such as DirectX 11) via a windows composition system. Moreover, the additional wrapper may be injected between the application program and the operating system in order to obtain a window handle of the application program.

Then, the computer system may capture the contents (operation 912) using the additional wrapper by requesting an associated DirectX-compatible surface from a window composition manager, and may display the captured content (operation 914) on a display. For example, the additional wrapper may capture the unified contents from a video frame buffer associated with the application program.

In some embodiments, the computer system provides a unified system for capturing the contents of a window on a virtual machine independently of the rendering path or technique (such as DirectX, Open Gl, etc.) used by the application program(s). In particular, video games or application programs in general may use a wide variety of techniques for rendering graphics on a display. A common technique for capturing the video output of an application program is injecting a software layer (which is sometimes referred to as a 'wrapper') between the game executable code and the software interface of the rendering technique that is being used by the video game.

In general, the way in which the images are accessed by the wrapper may depend on the rendering technique that is being used. Therefore, if many rendering techniques are supported by the computer system, a specific wrapper may need to be implemented for each rendering technique, thereby multiplying the development and maintenance costs for each of the available rendering techniques.

In computing technique, the computer system may use an agnostic approach for drawing and for capturing the video output of application programs. This approach may unify different rendering techniques into a single rendering path without incurring in the increased costs associated with making additional copies in main memory or in the graphics processing unit (GPU) memory of the images rendered by the video game. Thus, drivers of this embodiment may include technical and economic efficiency.

As noted previously, video games or applications often use a wide variety of different techniques for rendering graphics on a display. For example, Windows operating systems may use DirectX and OpenGL, but there are many others, such as GDI or Direct2D, which are also used by video games and other applications. Because most of these rendering techniques have many different versions (e.g., DirectX has versions 7, 8, 9, 9Ex, 10 and 11), there are usually a large number of different rendering techniques that may need to be supported by a cloud-based gaming service in order to run video games that are compatible with Windows.

Moreover, a common technique for capturing the video output of an application program is to inject a wrapper between the video-game executable code and the software interface of the rendering technique that is being used by the video game (e.g., DirectX 9). This software layer may capture the images generated by the video game and may send them to the streaming subsystem, which in turn may send those images to the end user. How these images are accessed by the wrapper is typically dependent on the rendering technique being used. For example, in the case of DirectX, the final image may be stored in the backbuffer texture of the graphic card. Therefore, if many rendering techniques may need to be supported by a video-game service and a specific wrapper may need to be implemented for each rendering technique, thereby significantly increasing the development time and expense.

Figure 10:
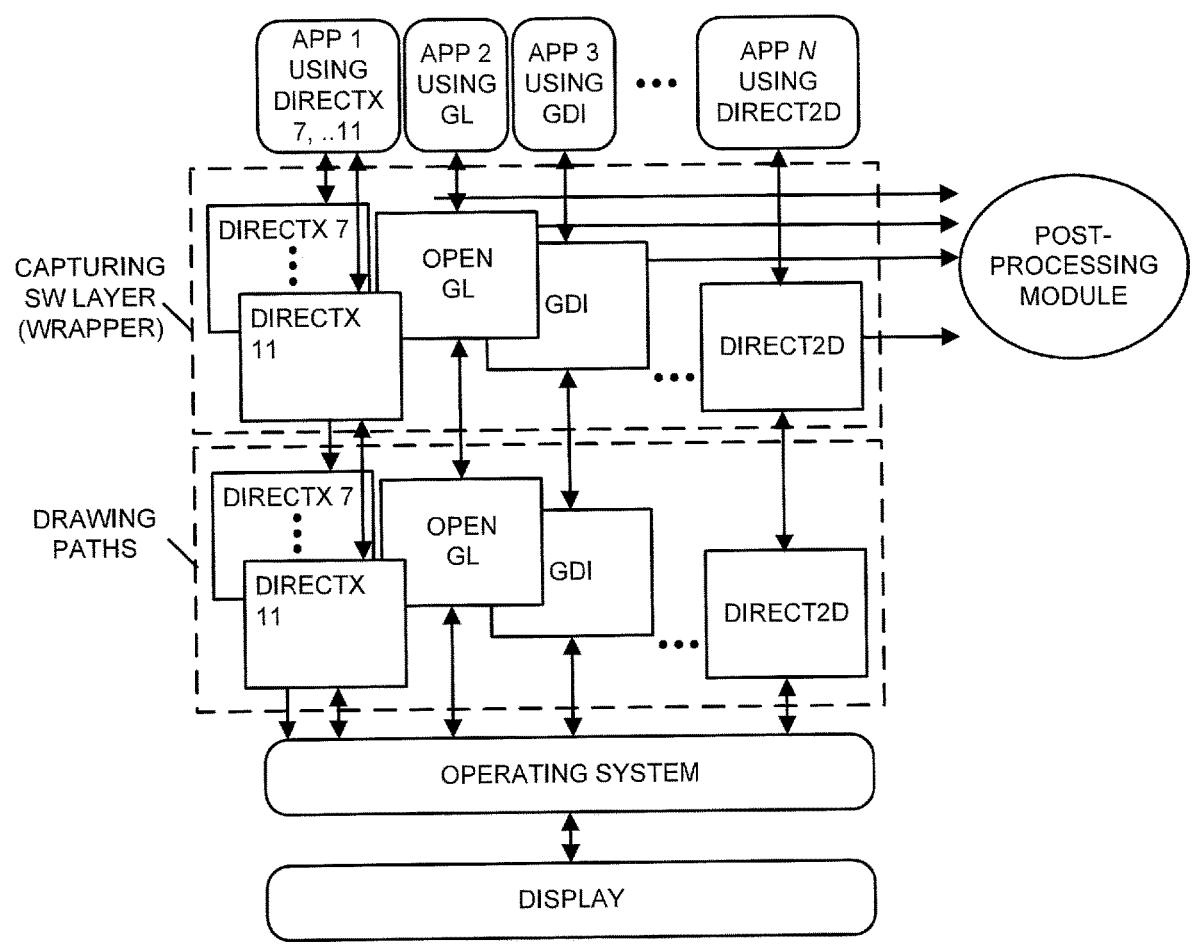
FIG. 10 is a drawing illustrating separate capture of content in the computer system of FIG. 1 in accordance with an embodiment of the present disclosure.

FIG. 10 presents a drawing illustrating an example of separate capture of content in computer system 118 of FIG. 1.

In addition, the computer system typically may need to display additional information on top of the images generated by a video game (e.g., the user interface of the cloud-based video-gaming service). This information may be rendered before or after capturing the final image generated by the video game. If it is captured before, the wrapper may have to use the same rendering technique that is being used by the video game. For example, in a DirectX 9 video game, the wrapper may issue DirectX commands for rendering the menu before presenting the final image on screen. This means that a different wrapper may be needed for each version of each rendering technique. Alternatively, if the additional information is rendered after the final image is generated, a single rendering path may be used for overlaying the menu on every video game, but at the cost of making many additional copies of the image may significantly affect performance.

In the computing technique, the computer system may use an alternative approach for capturing the video output of video games. This approach may unify different rendering techniques in one single rendering path without incurring the additional costs associated with making additional copies in main memory or GPU memory of the images rendered by the video game.

The approach in the computing technique may make use of a window composition manager that is included in Windows operating system since Windows Vista. Before Vista, each video game usually painted its images directly on the screen, but with the window composition system, each video game may be actually rendering its video output in its own separate DirectX 11 texture. Then, the composition manager may combine these surfaces in one and may present the final result on screen. This means that graphic libraries in current versions of Windows are internally rendering in DirectX 11 and the windows composition system may have access to these surfaces.

Figure 11:
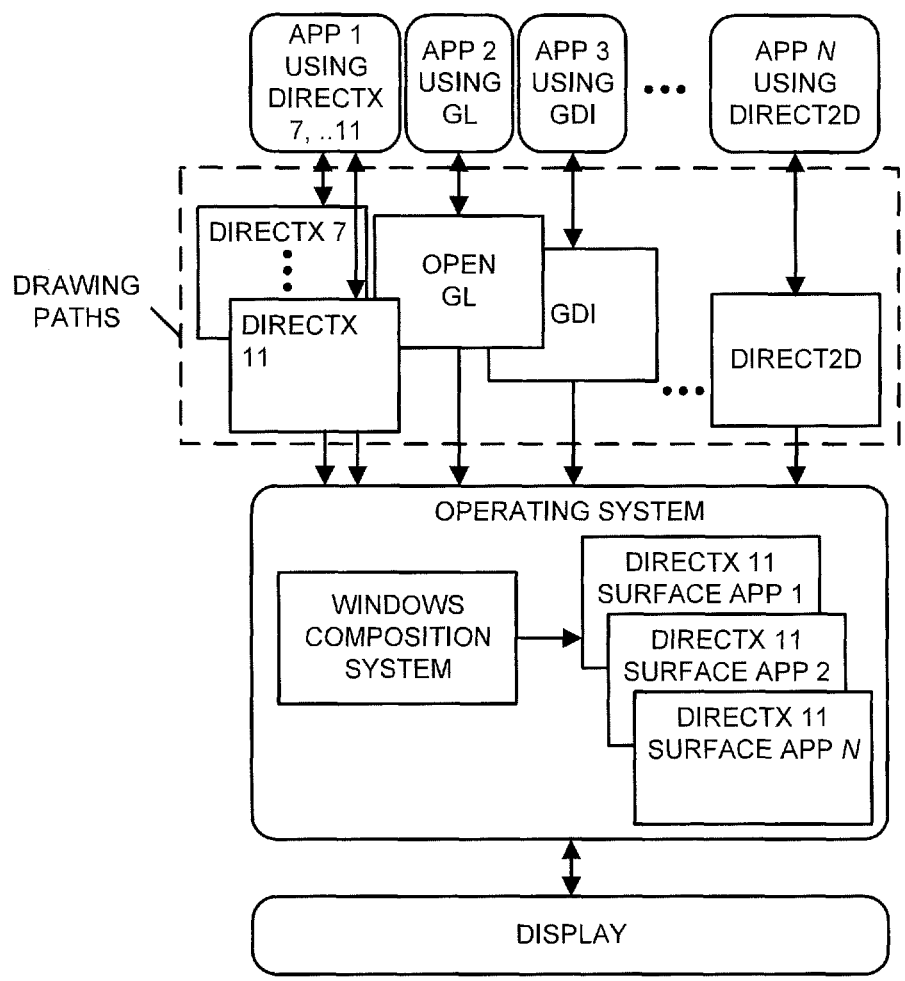
FIG. 11 is a drawing illustrating unified capture of content in the computer system of FIG. 1 in accordance with an embodiment of the present disclosure.

The capabilities of this feature of the operating system is shown in FIG. 11, which presents a drawing illustrating an example of unified capture of content in computer system 118 of FIG. 1. Note that, if the capturing library had access to the surfaces, it may capture the output of any video game using a single capturing technique, independently of the rendering technique that was used to generate each surface in the first place and without making additional copies of the image.

Figure 12:
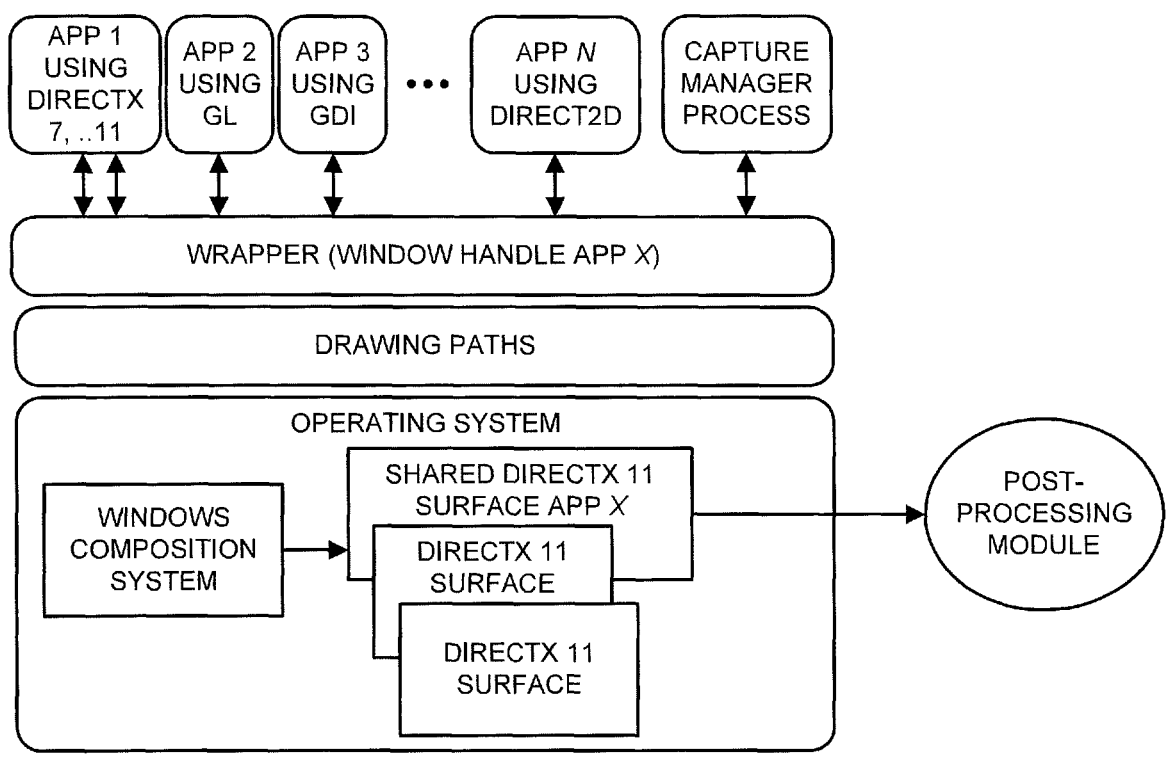
FIG. 12 is a drawing illustrating unified capture of content in the computer system of FIG. 1 in accordance with an embodiment of the present disclosure.

Moreover, a unified approach for capturing the surfaces used by the window composition manager is shown in FIG. 12, which presents a drawing illustrating an example of unified capture of content in computer system 118 of FIG. 1. Instead of capturing the video output directly from the video game process as is shown in FIG. 10, a different process is created (which is sometimes referred to as the 'capture manager process'), which may be responsible for capturing the images rendered by the video game and overlaying any additional information before sending them to the user as a video stream using a post-processing module. Note that the capture manager process may use a single rendering technique, such as DirectX 11.

The capture manager process may inject an additional wrapper between the application programs and the operating system in order to obtain the window handle of a specific application program. Then, this wrapper may use the window handle for requesting the associated DirectX surface from the window composition manager. Note that DirectX 11 surfaces can be shared between several processes, so the capture manager process may capture the content of this shared surface when the video game has finished painting on it without copying the surface, thereby improving performance and reducing costs. Note that the captured content may be sent to the user as a video stream using the post-processing module.

In summary, this embodiment of the computing technique may be based on the use of the Windows composition system, the possibility to use a shared DirectX surface and the introduction of an additional wrapper to obtain the windows handler. These operations may be managed by the capture manager process. The obtained result may allow unified and efficient capture of a rendered application and the overlay, if any, for post-processing.

Figure 13:
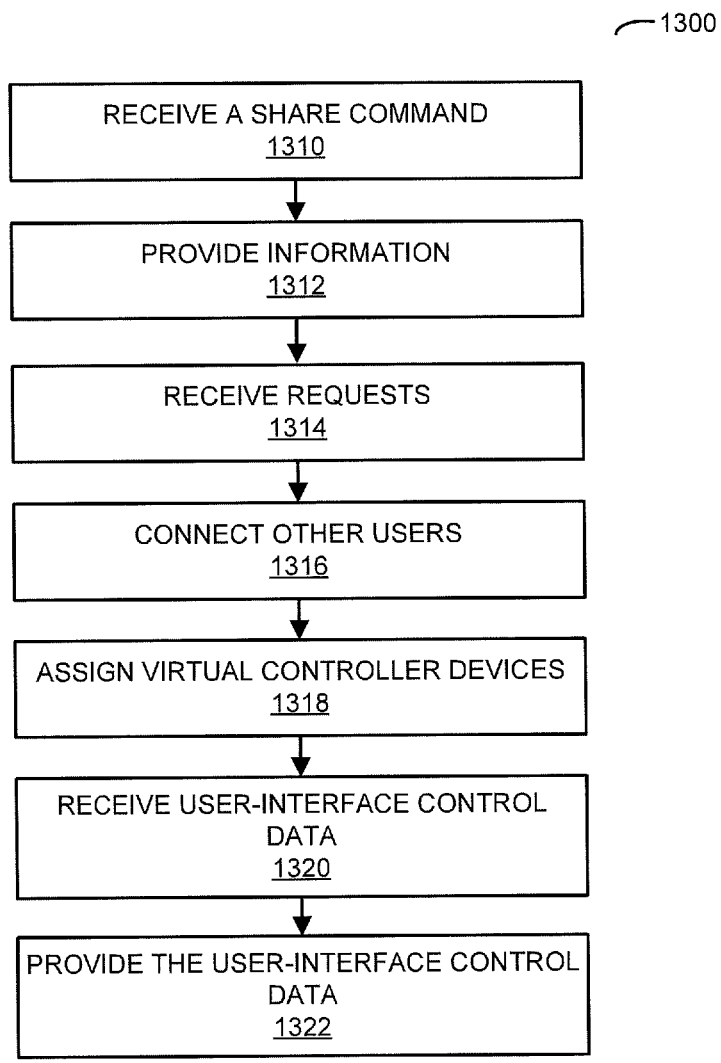
FIG. 13 is a flow diagram illustrating a method for modifying behavior of an application program in accordance with an embodiment of the present disclosure.

FIG. 13 presents a flow diagram illustrating an example of a method 1300 for modifying behavior of an application program, which may be performed by a computer system (such as computer system 118 in FIG. 1). During operation, the computer system receives, from a user of an electronic device, a share command (operation 1310), which allows other users to connect to the user's video-gaming session. In response, the computer system may provide information (operation 1312) that specifies the user's video-gaming session to the other users.

Then, the computer system may receive requests (operation 1314) from electronic devices (such as video-gaming devices) associated with one or more of the other users to join the user's video-gaming session. Moreover, the computer system may connect these other users (operation 1316) with the user's video-gaming session, and may assign virtual controller devices (operation 1318) to the electronic devices of the other users.

Next, the computer system may receive, via the virtual controller devices, user-interface device control data (operation 1320) from the electronic devices associated with different users at different locations. Furthermore, the computer system may provide the user-interface device control data (operation 1322) to the user's video-game session. Note that the video game may support local multiplayer capability, thereby simulating that different users are in the same location.

In some embodiments, the computer system expands a local multiplayer experience into online gaming through a video-game streaming platform. In particular, a so-called 'virtual couch' approach may use a video-game streaming technique to expand local multiplayer capabilities of video games into online gaming, thereby offering players in different physical locations the ability to play local multiplayer video games.

In general, video-game streaming techniques offers video games that are executed in remote cloud-based computers or servers instead of in the user's own electronic device. During these techniques, video and audio may be sent to the user with images of a video game, and data from user-interface control devices or input devices (such as a mouse, a keyboard, etc.) may be received back in the cloud-based computers or servers several times per second in order for a user to interact with the video game.

In the computing technique, user-interface device control data from different users can be send to the same video game, thereby simulating that different users are in the same location. In particular, in order to allow users located in different physical locations and playing video games via streaming to share video-gaming sessions in video games that support local multiplayer capabilities, each of the users may play from their own physical location as if they were sharing the same video-gaming device and were sitting together in the same couch.

Note that a video game supporting local multiplayer capability may be defined as a video game that allows two or more players to play simultaneously in the same computer and screen, where each of the players uses their own user-interface control devices (such as gamepads, mice, a keyboard, etc.).

These video games usually represent the players' avatars in the same screen or make use of 'split-screen' techniques to track each player's progress. Typical video games that offer local multiplayer gaming are, but not limited to: fighting games, racing and sports games, and action or puzzle games.

In order for a video game to support local multiplayer, the user-interface control devices used during the video game may be connected to the video-gaming device running the video game. A video game that allows players to play together while each of them is running a separate instance of the video game in their own video-gaming device (such as a cellular telephone or a handheld console) may not be considered supporting local multiplayer, even if the physical proximity is required because of network bandwidth or connection limitations.

In the computing technique, the virtual couch may be used to connect or couple two or more players to the same video-gaming session, thereby allowing the local multi-player experience to be shared through their network connection to the video-gaming computer system. When a player chooses to share their playing sessions as a virtual couch, it may become visible to other users browsing for shared sessions. Then, other users may be able to connect to that player's session, instead of starting a video game on their own.

Note that the user that started the video game and that is sharing their video-gaming session may be considered to be the host. Other users that connect to the host's virtual couch may be considered to be guests.

When one or more guests join a shared virtual couch, the computer system may start by sending to the guests the same video and audio streaming that is being generated by the video game and that is being sent to the host. Thus, the players sharing the virtual couch may see and hear the same video game, while still only being executed once in the computer system.

While joining the host shared session, the computer system may assign to each guest a virtual controller device. Each virtual controller device may represent a single gamepad that can be connected to a computer in order to control the video games. Virtual controller devices may usually be matched to the physical gamepads that the host has connected to their local video-gaming device. When a guest joins a virtual couch session, one of the virtual controller devices may be matched to the guest's physical gamepad. The video-game streaming system may then start sending the input from the guest to the computer system that is running the video game, instead of only receiving the input from the host. This may keep the video game working under the illusion that the gamepads from the host and the guests are physically connected to the server or the computer that is executing the video game, thereby allowing the players to play the same video game via their online connections to the video-game servers as if they were all sharing the same computer in the room.

In some embodiments, virtual controller #1 is reserved to the host, as this is usually the gamepad that controls the video-game menu and functions. In a typical situation, both the host and the guests connecting to the session may use one gamepad each. Therefore, the guests may be assigned virtual controllers #2 onward. If two or more gamepads are connected to the host device, the same number of virtual controller devices may be reserved to the host and they may be kept matched to their own gamepads. Similarly, if a guest joins the virtual session while having more than one gamepad, they may be assigned as many virtual controller devices as there are gamepads connected, up to a limit set for any single virtual couch session. This capability may allow for two players to play from the host's connection, sitting physically next to one another and each using their own gamepad. Moreover, two more players may play from a single guest connection. Other embodiments may support other combinations between players being together or connecting from their own devices to the virtual couch.

Note that the host player may be able to access a management screen for the virtual couch that they created in order to manage players that are connected as guests, as well as changing what virtual controller devices are assigned to each guest, reserved for the host itself or available to future guests.

Figure 14:
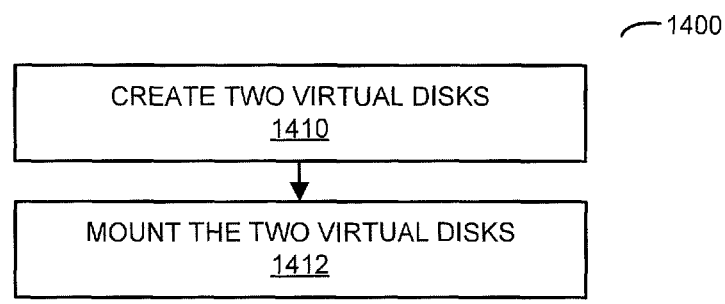
FIG. 14 is a flow diagram illustrating a method for decomposing an application program into two virtual disks in accordance with an embodiment of the present disclosure.

FIG. 14 presents a flow diagram illustrating an example of a method 1400 for decomposing an application program into two virtual disks, which may be performed by a computer system (such as computer system 118 in FIG. 1). During operation, the computer system creates two virtual disks (operation 1410) associated with an application program, where a first virtual disk includes application-program data and/or registry data, and a second virtual disk includes user data. Then, when executing the application program, the computer system mounts the two virtual disks (operation 1412) using a virtual machine, so that the application program can be used as if it had been installed on a single virtual disk.

In some embodiments, the computer system decomposes a single application program into two virtual disks in order to separate application-program data from user data and to allow execution of the application program as if there were a single virtual disk without knowledge by the application program or modification of the application program (such as the source code or the compiled executable).

For example, the computing technique may be used with a Windows-based computer system to decompose an application program into two virtual disks, one with the application-program files and/or registry entries that store information that can be modified by the user. The computer system may allow both virtual disks to be mounted on a virtual machine, so that the application program can be used as if it had been installed on a single virtual disk.

The computer system may be used to execute an application program with total control of which files are modified in the computer system by the application program and where they are modified. The control of the files and where they are stored may occur without knowledge of the application program.

In particular, if the application program is installed normally, it may be stored in a default folder, and the installer may make changes to some files and the registry in order to notify the computer system where the files are stored. In the computing technique, the computer system may modify this approach by storing the application-program data from the original application program in a virtual disk and by storing user data in another virtual disk. This separation may be transparent to the application program and, when executed, the behavior may be the same as if it the installation was 'normal.'

In order to achieve these goals, the behavior of the target application program may be needed. In turn, this means that the application-program installer behavior may need to be determined, including: which files are copied where and which files are modified. This information may be collected using a 'sniffer application' that determines the pattern for each application-program installation. For example, application data may be stored in a specific folder, and then, some files with user data may modified or stored.

In the computing technique, a desired application program is installed on a virtual disk in a clean Windows (which is used as an illustrative operating system) virtual machine. After the installation, the application data may be stored on the virtual disk. In addition, the computer system may create another virtual disk to store user data that is a copy of a default user folder on Windows after installation.

By executing a 'sniffer application' for each application program, the computer system may create or generate a video-game installer for each one. This video-game installer previously may know the desired user folder and may create a key on the Windows Registry to virtualize the registry for that user. Consequently, the changes made on the Windows Registry for the original application program may be written on the selected key registry.

We now provide more details of the separation of the application program in two virtual disks and its execution as a single one. In the virtual machine, there may be a service that receives information about which application-program to execute and from whom. After that, this service may ask which virtual disk has to attach to the virtual machine. After attaching confirmation, the service may mount an application-program virtual disk. Next, the computing system may download and mount the second virtual disk with the user data. This second mounted virtual disk may be the user folder during execution of the application-program. Moreover, after mounting the second virtual disk, the computer system may download specific settings from the selected application program and the user (such as a preferred language, profile, etc.). In addition, the computer system may set environment variables for the video-game installer present in downloaded settings. In this way, the video-game installer may know the user and user folder in order to make specific changes on the registry and user folder.

Now, the computer system can execute the application program. This may be performed by a launcher application that receives information of user profile. Using the launcher application, the application program may be executed and the saved files may be redirected to the selected folder, where the second virtual disk was mounted.

Thus, the computing technique may be used to separate an application program on two virtual disks. One virtual disk may be dedicated to application-program data, and other virtual disk may be dedicated to user data and may execute the application program as a single application program.

This approach to implementing the application program in the computer system may provide scalability and a reduced installation time because copying of the application-program data may be performed once per user on each of the virtual machines. Moreover, the computing technique may allow execution of more than one application-program instance sharing the same desktop and the same application-program virtual disk, with the user data saved on the second virtual-disk mounted folder. Furthermore, this approach may provide backup cost savings, because the computer system may only need to backup the user data on the second virtual disk per application program. Additionally, it may be easy to move users between locations because the user data is centralized in a common repository that can be share across data centers using a distributed file system (such as a Hadoop distributed file system).

In some embodiments of one or more of the aforementioned methods, there may be additional or fewer operations. Furthermore, the order of the operations may be changed, and/or two or more operations may be combined into a single operation.

We now describe embodiments of an electronic device, which may perform at least some of the aforementioned operations in one or more of the embodiments of the computing technique. FIG. 15 presents a block diagram illustrating an electronic device 1500, such as one of electronic devices 110, optional base station 112, optional access point 116, and computer system 118 in FIG. 1. Note that electronic device may be a single machine at a location or multiple machines that are distributed over two or more geographic locations.

This electronic device includes processing subsystem 1510, memory subsystem 1512, and networking subsystem 1514. Processing subsystem 1510 includes one or more devices configured to perform computational operations. For example, processing subsystem 1510 can include one or more processor cores, microprocessors, application-specific integrated circuits (ASICs), microcontrollers, programmable-logic devices, GPUs and/or one or more digital signal processors (DSPs).

Memory subsystem 1512 includes one or more devices for storing data and/or instructions for processing subsystem 1510 and networking subsystem 1514. For example, memory subsystem 1512 can include dynamic random access memory (DRAM), static random access memory (SRAM), and/or other types of memory. In some embodiments, instructions for processing subsystem 1510 in memory subsystem 1512 include: one or more program modules or sets of instructions (such as one or more program modules 1522 or operating system 1524), which may be executed by processing subsystem 1510. Note that the one or more computer programs may constitute a computer-program mechanism. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), including: control logic 1516, an interface circuit 1518, one or more antennas 1520 and/or input/output (I/O) port 1530. (While FIG. 15 includes one or more antennas 1520, in some embodiments electronic device 1500 includes one or more nodes 1508, e.g., a pad, which can be coupled to one or more antennas 1520. Thus, electronic device 1500 may or may not include one or more antennas 1520.) For example, networking subsystem 1514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices as described previously.

Within electronic device 1500, processing subsystem 1510, memory subsystem 1512, and networking subsystem 1514 are coupled together using bus 1528. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/ or electro-optical connections among the subsystems.

In some embodiments, electronic device 1500 includes a display subsystem 1526 for displaying information on a display, which may include a display driver and the display, such as a liquid-crystal display, a multi-touch touchscreen, etc. Moreover, electronic device 1500 may include a user-interface subsystem 1532 with one or more user-interface control devices for acquiring or capturing one or more user actions or user activity when a user interacts with or uses a user interface displayed on display subsystem 1526.

Electronic device 1500 can be (or can be included in) any electronic device with at least one network interface. For example, electronic device 1500 can be (or can be included in): a desktop computer, a laptop computer, a subnotebook/ netbook, a server, a tablet computer, a smartphone, a cellular telephone, a smart watch, a consumer-electronic device, a portable computing device, an access point, a router, a switch, communication equipment, a wearable appliance, a server, a cloud-based computer system, a main-frame computer, a workstation and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, display subsystems and/or audio subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments, some or all of a given subsystem or component can be integrated into one or more of the other subsystems or component(s) in electronic device 1500. For example, in some embodiments one or more of program modules 1522 (such as an application program or a modification program) is included in operating system 1524.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of electronic device 1500. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While communication protocols compatible with Ethernet and Wi-Fi were used as illustrative examples, the described embodiments of the computing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the computing technique may be implemented using one or more program modules 1522, operating system 1524 (such as a driver for an integrated circuit) and/or in firmware in an integrated circuit. Alternatively or additionally, at least some of the operations in the computing technique may be implemented in a physical layer, such as hardware in an integrated circuit.

In computer system 1500, users of electronic devices 110 (FIG. 1) may use a software product or application program, such as instances of a software application that, at least in part, is resident on and that executes on one or more of electronic devices 110. In some implementations, the users may interact with a web page that is provided by computer system 1500 via network 128, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture. However, in other embodiments, the software product executes remotely from electronic devices 110 on electronic device 1500.

In some embodiments, the software application operated by the users may, at least in part, be a standalone application or a portion of another application that is resident on and that executes on electronic devices 110 (such as a software application that is provided by computer system 1500 or that is installed on and that executes on electronic devices 110).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
an interface circuit configured to communicate with at least an electronic device;
one or more processors, coupled to the interface circuit and memory, configured to execute an application program and a modification program; and
the memory configured to store the application program and the modification program,
wherein, when executed by the processor, the application program causes the computer system to:
provide, to the electronic device, image information that specifies a user interface for display on the electronic device, wherein the image information from the application program is buffered in a video frame buffer; and
receive, from the electronic device, information that specifies user-interface activities of a user; and
wherein, when executed by the processor, the modification program causes the computer system to:
identify a state of the application program by analyzing the image information, from the video frame buffer, provided by the application program;
selectively modify the image information that specifies the user interface, from the video frame buffer, to include an additional or alternate user interface portion based on the identified state of the application program;
provide the modified image information, with the additional or alternate user interface portion, to the electronic device for display; and
after subsequently receiving information that specifies a user-interface activity, associated with the additional or alternate user interface portion, selectively perform one or more operations based on 1) the user-interface activity and 2) the modification to the image information.

2. The computer system of claim 1, wherein the modification program modifies the user interface associated with the application program without changing source code for the application program and without changing a compiled executable of the application program.

3. The computer system of claim 1, wherein the modification program only analyzes a subset of pixels in the user interface that are associated with user-interface icons.

4. The computer system of claim 1, wherein the modification program analyzes the image information using an image-pattern recognition technique.

5. The computer system of claim 1, wherein the modification program modifies the image information by combining the image information with predetermined additional image information that specifies the additional or alternate user interface portion in the user interface.

6. The computer system of claim 5, wherein the modification includes changing a user-interface function in the user interface.

7. The computer system of claim 1, wherein the modification program performs the identifying, the selective modifying, the providing the modified image information, and the performing in run time.

8. The computer system of claim 1, wherein the computer system is located remotely from the electronic device.

9. The computer system of claim 1, wherein the one or more operations include at least one of: changing a state of the application program, providing additional information to the electronic device, and modifying the user-interface activity before providing the modified user-interface activity to the application program.

10. The computer system of claim 1, wherein the application program includes a video game.

11. The computer system of claim 1, wherein selectively modifying the image information and providing the modified image information comprises:
retrieving video frame information from the video frame buffer;
modifying the video frame information based on the identified state to create a modified video frame, with the additional or alternate user interface portion; and
transmitting the modified video frame via the video frame buffer to the electronic device for display.

12. A non-transitory computer-readable storage medium for use in conjunction with a computer system, the computer-readable storage medium storing a modification program that, when executed by the computer system, causes the computer system to, in run time, selectively modify image information specifying a user interface associated with an application program, wherein the image information is buffered in a video frame buffer, by performing at least the process of:
- identifying a state of the application program by analyzing the image information, from the video frame buffer, that specifies the user interface associated with the application program;
- selectively modifying, in run time and based on the identified state of the application program, the image information that specifies the user interface from the video frame buffer to include an additional or alternate user interface portion;
- providing the modified image information, with the additional or alternate user interface portion, to an electronic device for display; and
- after subsequently receiving information that specifies a user-interface activity associated with the additional or alternate user interface portion, selectively performing one or more operations based on the user-interface activity.

13. The computer-readable storage medium of claim 12, wherein the modification program modifies the user interface associated with the application program without changing source code for the application program and without changing a compiled executable of the application program.

14. The computer-readable storage medium of claim 12, wherein the modification program only analyzes a subset of pixels in the user interface that are associated with user-interface icons.

15. The computer-readable storage medium of claim 12, wherein the modification program analyzes the image information using an image-pattern recognition technique.

16. The computer-readable storage medium of claim 12, wherein the modification program modifies the image information by combining the image information with predetermined additional image information that specifies the additional or alternate user interface portion in the user interface.

17. The computer-readable storage medium of claim 12, wherein the modification program performs the identifying, the selective modifying, the providing the modified image information, and the performing in run time.

18. The computer-readable storage medium of claim 12, wherein the one or more operations further include at least one of: changing a state of the application program, providing additional information to the electronic device, and modifying the user-interface activity before providing the modified user-interface activity to the application program.

19. A method for selectively modifying image information specifying a user interface associated with an application program, wherein the image information is buffered in a video frame buffer, the method comprising:
by a program module executed by a computer system:
- identifying a state of the application program by analyzing the image information, from the video frame buffer, that specifies the user interface associated with the application program;
- selectively modifying, based on the identified state of the application program, the image information that specifies the user interface from the video frame buffer to include an additional or alternate user interface portion;
- providing the modified image information, with the additional or alternate user interface portion, to an electronic device for display; and
- after subsequently receiving information that specifies a user-interface activity that is associated with the additional or alternate user interface portion, selectively performing one or more operations an operation based on the user-interface activity.

20. The method of claim 19 wherein selectively modifying the image information is performed in run time.

* * * * *